UNITED STATES PATENT OFFICE.

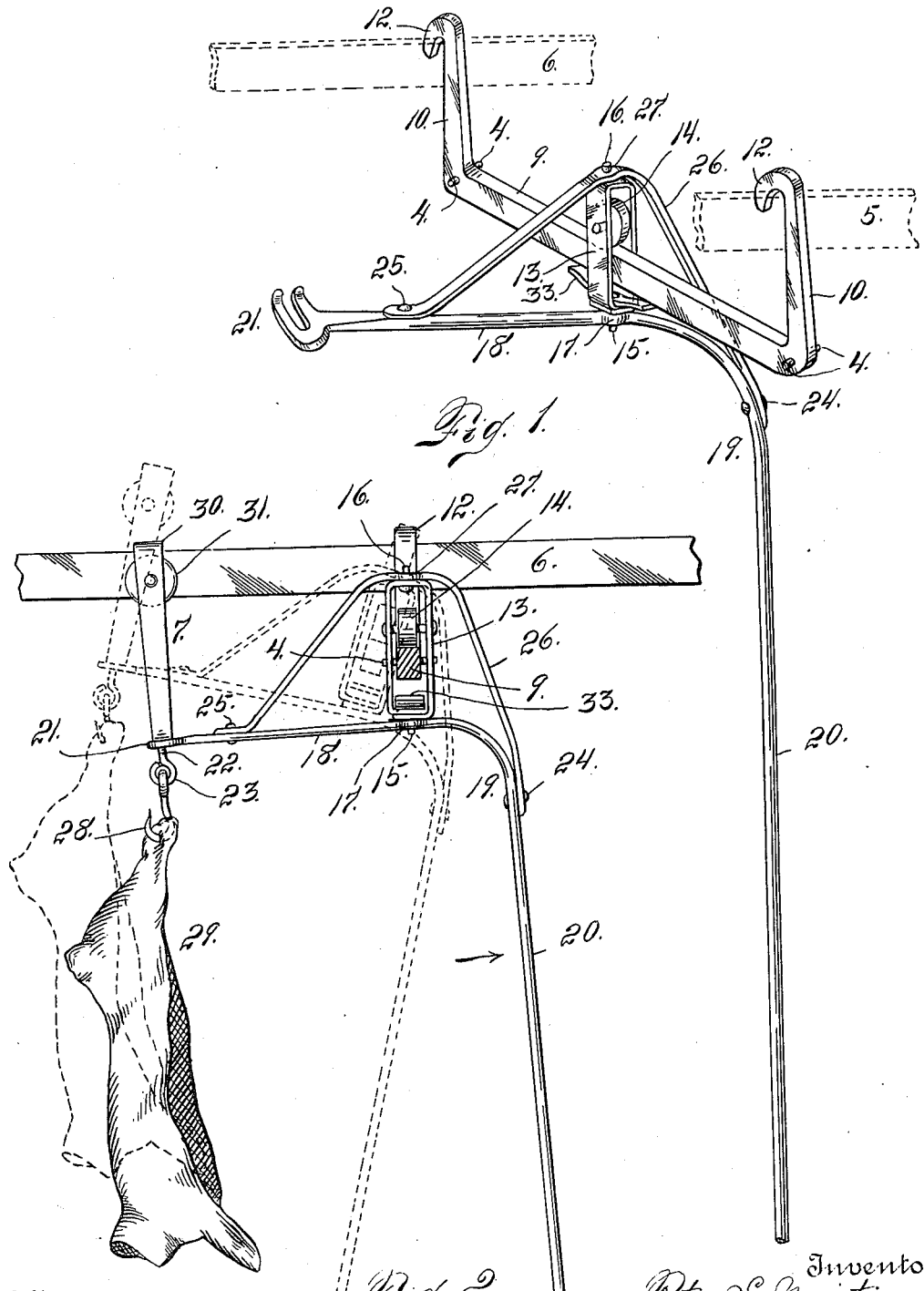

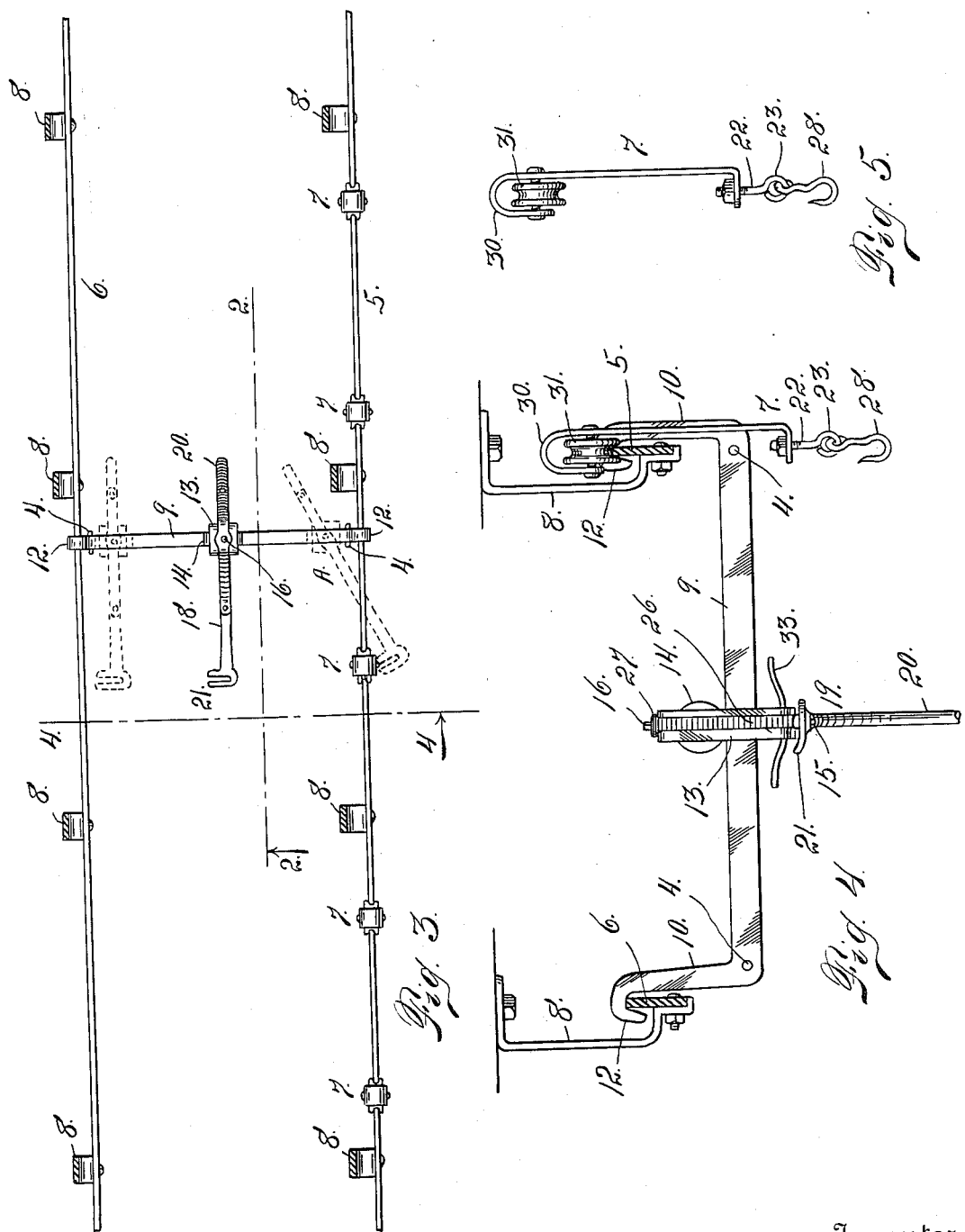

PETER S. MEISTER, OF DENVER, COLORADO.

CARCASS-SHIFTING APPARATUS FOR PACKING-HOUSES.

1,036,297.  Specification of Letters Patent.  Patented Aug. 20, 1912.

Application filed March 23, 1909. Serial No. 485,342.

*To all whom it may concern:*

Be it known that I, PETER S. MEISTER, a citizen of the United States, residing in the city and county of Denver and State of Colorado, have invented certain new and useful Improvements in Carcass - Shifting Apparatus for Packing-Houses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for shifting carcasses of beef or other animals from one bar upon which they are hung to another bar upon which the said carcasses or parts thereof may be readily conveyed to the desired location.

In packing houses, the carcasses of beef for instance are usually hung in halves upon bars arranged at a suitable height above the floor, each half of beef being connected with a separate hanger. Adjacent the bar upon which these halves of beef are hung, is what I will term an operating bar or line to which any carcass of beef may be transferred from any position upon the main bar. Heretofore, as far as I am aware, it has been necessary to lift the carcasses of beef, a half at a time from one bar and place them upon the other bar.

The object of my invention is to facilitate this work by the use of a simple device, whereby a single person can quickly and easily transfer the carcasses from the main bar to the adjacent operating bar, and to this end the invention consists of the features, arrangements and combinations hereinafter described and claimed, all of which will be fully understood by reference to the accompanying drawing in which is illustrated an embodiment thereof.

In this drawing, Figure 1 is a perspective view illustrating my improved device shown in detail, the two bars with which it is connected being indicated by dotted lines. Fig. 2 is a side elevation of the device shown in two positions one in full lines and one in dotted lines. In this view a part of a carcass is illustrated, being shown in two positions to harmonize with the positions of the device. Fig. 3 is a top plan view illustrating two bars, one being the main bar upon which the carcasses are hung and the other the operating bar to which they are to be transferred. In this view, my improved device is shown in three positions, one in full lines and two in broken lines. Fig. 4 is a section taken on the line 4—4 Fig. 3. Fig. 5 is a detail view of one of the hangers which is of ordinary construction.

The same reference characters indicate the same parts in all the views.

Let the numerals 5 and 6 designate the two bars, 5 designating the main bar and 6 the operating bar. Upon the bar 5 a number of hangers 7 are illustrated at suitable intervals and it may be assumed that half of a carcass is supported upon each hanger. The bar 5 is suspended by supporting devices 8 connected with the ceiling not shown. These supporting devices are the same for both of the bars 5 and 6.

My improved device is provided with a transverse bar 9 having upwardly projecting arms 10 at its extremities, these arms terminating at their upper ends in hooks 12 which respectively engage the bars 5 and 6 which thus form a support for my improved apparatus. The bar 9 passes through a rectangular trolley 13 carrying a roller 14 and having journals 15 and 16 at its opposite extremities. The lower journal 15 engages a bearing 17 formed in the horizontal arm 18 of the operating rod 19 which has a long depending member 20. The free extremity of the horizontal arm 18 is provided with a hook 21 adapted to engage the shank 22 of an eye-bolt 23 with which the hanger 7 is equipped.

Secured to the operating rod at points 24 and 25 is an upwardly bent arch-shaped member 26 whose upper portion is provided with an opening 27 which is engaged by the top journal 16 of the trolley 13. By virtue of this arrangement the operating rod may be turned to occupy any position with reference to the cross bar 9 and the supporting bars 5 and 6.

Connected with the eye-bolt 23 of the hanger 7 is a hook 28 adapted to be directly connected with the part 29 of the carcass to be handled. The upper portion of the hanger is U-shaped as shown at 30 and carries a roller 31 adapted to engage a supporting bar 5 or 6 as the case may be.

Assuming that it is desired to lift a part 29 suspended by one of the hangers 7, from the bar 5, to the bar 6, the cross bar 9 will be first mounted upon the bars 5 and 6 by causing the hooks 12 of the upwardly projecting arms 10 to respectively engage the said bars. This may be quickly done by the use of the operating rod 19 whose member 20 may be of any suitable length. After this is done, the operating rod is swung upon the pivot pins or journals 15 and 16 of the trolley 13 to cause its hook 21 to engage the shank 22 of the eye-bolt 23 of the hanger. As soon as this is done, the operating rod is pushed to the dotted position (see Fig. 2), whereby the hanger 7 is lifted from the bar 5, together with the carcass part 29. The operating rod is then turned slightly, sufficiently to cause the upper extremity of the hanger 7 to clear the bar 5, or to the dotted line position designated by the letter A in Fig. 3. The operating rod is then moved in the direction indicated by the arrow in Fig. 2, whereby the hanger is moved downwardly sufficiently to allow its upper extremity to pass under the bar 5. The trolley is then moved along on the member 9 toward the bar 6, the rod being so manipulated as to cause the roller 31 of the hanger to engage the operating bar 6. The hook 21 of the apparatus is then disengaged from the hanger and the latter is left suspended upon the bar 6 having been transferred thereto in the manner explained. From this explanation, it will be understood that a carcass of beef or other animal, may be readily transferred from any part of the main line 5, to the operating line 6, the services of a single man only being required.

The bottom of the trolley just underneath the track bar 9, is provided with a spring 33 which projects on opposite sides of the trolley and in line with the track 9 and forms a sort of support for the said track to keep it from tilting during the manipulation of the track for the purpose of connecting it with the bars 5 and 6.

In further explanation of the device, it may be stated that the bars 5 and 6 are both located on the same side of the hangers 8. For this reason it is necessary to throw the hanger downwardly by the proper manipulation of the rod 20, after the hanger together with its load, has been lifted from the bar 5 since the hanger must be lowered sufficiently to allow it to pass under the bar 5 before it can be moved on the track 9 transversely between the bars in order to transfer the hanger to the bar 6.

In order to maintain the trolley in proper operative relation with the track 9 at all times, the track is provided at its opposite ends or at the angles formed by its body portion and the upwardly projecting arms 10, with pins 4 projecting in opposite directions therefrom and forming steps to engage the opposite side parts of the trolley 13 when at the extremities of the track 9, thus preventing the trolley from leaving the body of the track. This is particularly important when handling the track with the manipulating arm, before the track has been connected with the bars 5 and 6. It is also important after the track is mounted upon the said bars since it limits the movement of the trolley in both directions after it has traveled the necessary distance for the proper performance of the function of the device.

Having thus described my invention, what I claim is:

1. The combination with two bars, arranged in suitable proximity to each other, a hanger having a depending bolt rigidly connected therewith, and a track arranged transversely between the two bars, and having hooks at its extremities loosely engaging the said bars, of a trolley mounted upon the said track, a manipulating handle loosely connected with the trolley, the upper extremity of the handle being hook-shaped to connect with the shank of the depending bolt of the hanger, whereby the latter may be held in an upright position, and transferred from one bar to the other, substantially as described.

2. In apparatus of the class described, the combination with bars mounted in suitable proximity, a hanger adapted to engage either bar, of a track detachably connected with the bars and extending transversely between them, a trolley mounted on the track, a manipulating arm pivotally connected with one extremity of the trolley, and an arch-shaped member connected with the arm and pivotally connected with the opposite end of the trolley, the upper extremity of the manipulating arm being fashioned to engage a hanger for the purpose set forth.

3. In apparatus of the class described, the combination of a track having hook-shaped extremities, a trolley mounted to travel upon the track, a manipulating arm pivotally connected with the opposite extremities of the trolley, the upper extremity of the said arm being provided with a hook for the purpose set forth.

4. In apparatus of the class described the combination with two parallel supporting bars suitably separated, a track having hook-shaped extremities loosely engaging the upper edges of the bars and spanning the space between them, a vertically disposed trolley member mounted upon the said track, a manipulating arm connected with the opposite extremities of the trolley, the said arm having a depending member and an upper member extending approximately at right angles to the depending member, the free extremity of the upper member being hook-shaped for the purpose set forth.

5. The combination with two separated parallel supporting bars, a hanger adapted to movably engage either bar and readily detachable therefrom, a track having upwardly projecting extremities terminating in hooks adapted to loosely engage the upper edges of the two bars, the body of the track spanning the space between them, a vertically disposed trolley consisting of a rectangular frame having pins projecting from its opposite ends above and below the track, and a manipulating arm pivotally connected with the pins at the opposite extremities of the trolley, the said arm having a depending member and an upper member extending approximately at right angles to the depending member, the free extremity of the upper member being fashioned to engage the said hanger for the purpose set forth.

6. In apparatus of the class described the combination with supporting bars, of a track mounted on the bars and spanning the space between them, a trolley mounted on the track whose opposite extremities are provided with stops for the purpose stated, and a manipulating bar connected in operative relation with the trolley for the purpose set forth.

7. In apparatus of the class described, the combination with a track, and supporting bars engaged by the track, of a trolley mounted to travel upon the track, a manipulating arm pivotally connected with the opposite extremities of the trolley, the said arm having one extremity hook-shaped, and a hanger having a shoulder at its lower end, and a bolt projecting downwardly therefrom and rigidly connected with the hanger, the shank of the bolt being adapted to be engaged by the hook of the manipulating arm, just below the shoulder, whereby the hanger may be supported in an upright position, when detached from the supporting bar.

In testimony whereof I affix my signature in presence of two witnesses.

PETER S. MEISTER.

Witnesses:
 JESSIE HOBART,
 A. EBERT O'BRIEN.